(12) United States Patent
Albrecht et al.

(10) Patent No.: US 11,560,832 B2
(45) Date of Patent: Jan. 24, 2023

(54) WASTEGATE VALVE

(71) Applicant: JAGUAR LAND ROVER LIMITED, Warwickshire (GB)

(72) Inventors: Matthew Albrecht, Coventry (GB); Guido Schlarb, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 17/135,512

(22) Filed: Dec. 28, 2020

(65) Prior Publication Data

US 2021/0189949 A1 Jun. 24, 2021

Related U.S. Application Data

(63) Continuation of application No. 15/321,207, filed as application No. PCT/EP2015/065444 on Jul. 7, 2015, now abandoned.

(30) Foreign Application Priority Data

Jul. 9, 2014 (GB) .................................... 1412227

(51) Int. Cl.
*F02B 37/18* (2006.01)
*F01N 3/20* (2006.01)

(52) U.S. Cl.
CPC .......... *F02B 37/183* (2013.01); *F01N 3/2006* (2013.01); *F02B 37/18* (2013.01); *F01N 2340/06* (2013.01)

(58) Field of Classification Search
CPC .............................................. F02B 37/18–186
See application file for complete search history.

(56) References Cited

U.S. PATENT DOCUMENTS

| | | | | |
|---|---|---|---|---|
| 4,463,564 | A * | 8/1984 | McInerney | F02C 6/12 60/602 |
| 2002/0078934 | A1 * | 6/2002 | Hohkita | F02B 37/16 123/564 |
| 2006/0112680 | A1 * | 6/2006 | Beer | F02D 41/0007 60/284 |
| 2013/0199175 | A1 * | 8/2013 | Hoshi | F16K 1/2007 60/602 |
| 2018/0252142 | A1 * | 9/2018 | Kubota | F01N 3/2006 |
| 2020/0173351 | A1 * | 6/2020 | Saeki | F01D 17/105 |

OTHER PUBLICATIONS https://www.chem.purdue.edu/gchelp/atoms/states.html (Year: 2014).*

* cited by examiner

*Primary Examiner* — Ngoc T Nguyen
(74) *Attorney, Agent, or Firm* — Carlson, Gaskey & Olds, P.C.

(57) ABSTRACT

A wastegate valve for a bypass path for a turbocharger in an internal combustion engine, the wastegate valve comprises a valve seat defining a plane which is non-orthogonal to the principal flow axis for gases flowing along the bypass path and a valve member pivotable from an open position to a closed position, wherein in the closed position the valve member is seated on the valve seat, and in a fully open position the valve member is positioned to direct gases exiting the bypass path onto a leading face of a catalytic converter monolith for heating the monolith.

14 Claims, 4 Drawing Sheets

WASTEGATE VALVE

TECHNICAL FIELD

This invention relates to a turbocharger turbine wastegate valve, commonly referred to as a wastegate valve. Aspects of the invention relate to an exhaust system for an internal combustion engine and a method of heating a catalytic converter associated with an internal combustion engine.

BACKGROUND

It is well known that there is a need and desire to decrease certain emissions from motor vehicles powered by internal combustion (IC) engines. The combustion of petrol and diesel produces environmentally deleterious emissions. Typically such emissions comprise hydrocarbons (HCs), carbon monoxide (CO), nitrous oxides ($NO_x$) and particulate matter.

Over the years various modifications to IC engines have been made to improve efficiency and to reduce deleterious emissions. An important historical development to reduce such emissions involved the installation of catalytic convertors in the exhaust system of IC engine equipped motor vehicles.

In petrol-powered IC engines modern catalytic converters catalytically oxidise HCs and CO to $CO_2$ and $H_2O$, whilst reducing $NO_x$ to nitrogen, these are so-called three-way catalytic converters. Such converters typically comprise a ceramic monolith, or sometimes a metallic foil monolith, carrying catalytic precious metals such as platinum, palladium and so on. In diesel-powered IC engines a diesel oxidation catalyst is typically used, sometimes coupled with other treatment means for the reduction of $NO_x$ to nitrogen.

For a petrol powered IC engine to operate at optimum efficiency, it is usual that a non-stoichiometric ratio of fuel and air is used. Moreover, for optimum catalytic efficiency the catalytic converter must operate at an elevated (i.e. above ambient) temperature. Whilst most if not all catalytic converters have an optimum working temperature they also have a so-called 'light-off temperature' which is the point at which the catalysed chemical reactions become self-sustaining and the so-generated heat helps to heat the converter monolith to or towards its optimum temperature. Accordingly, at non-stoichiometric combustion mixes and low catalyst temperature there is a risk that emissions can be increased.

In order to heat a catalytic converter it is usual to use the residual heat of the exhaust gas. Clearly upon engine start up there is a significant period of time before the exhaust gas can heat the catalytic converter and other exhaust components (which have substantial thermal mass) sufficiently that the catalytic converter reaches its effective operating temperature. Until the temperature is raised sufficiently the catalytic converter will not be optimally effective and hence emissions will likely be higher than desired. Indeed, it is during the warm up phase of an IC engine that maximum emissions are generally experienced.

In certain vehicles it is known to provide a turbocharger in the exhaust system. Turbochargers are usually provided to enhance engine performance. However, to withstand the high temperatures of the exhaust gas immediately after the exhaust valves, components of the turbocharger, such as the turbine housing, may be cast from steels with high thermal inertia. Thus, turbochargers typically have a high thermal inertia and, because the turbocharger is usually positioned upstream of the catalytic converter, cause a reduction in exhaust gas temperature reaching the catalytic converter in, or just after, start-up conditions. Accordingly, until such time as the entire exhaust system reaches at least a degree of thermal equilibrium it is possible that the catalytic converter will not be heated to its optimum operating temperature and/or to the light off temperature and hence will not be as effective in reducing emissions.

Consumer pressure is driving manufacturers to produce larger motor vehicles, for example sports utility vehicles (SUVs), off-road vehicles, vans and the like, while legislative and social pressures are driving engine size down in an effort to limit fuel consumption and the accompanying emissions. However, a reduction in engine size will likely reduce the heat available to the catalyst, while the thermal mass of the intervening components (including the turbocharger, if present) is likely to remain the same or increase, further exacerbating the problem. For example, new emissions standards are likely to link the size (volume) of the catalyst to the size or weight class of the vehicle. Therefore, a larger SUV will have a larger catalyst volume than a smaller SUV and hence will require a greater amount of heat energy to achieve the required light-off temperature than the smaller SUV. A downward pressure on engine size for vehicles (e.g. SUVs) will exacerbate the heating problem for the larger vehicles.

To help attend to the catalytic converter heating lag issue it has been proposed to provide heating coils within the catalytic converter to heat the catalytic converter monolith up to, or towards, an optimum operating temperature. Clearly, such a solution is likely to add cost and complexity to an exhaust gas system. For example, deploying such a solution is likely to be problematic in terms of mass production. Moreover, in certain diesel vehicles where a diesel oxidation catalyst (DOC) is combined with a diesel particulate filter (DPF) local heating of the DPF without an associated air flow can lead to a combustion risk.

It is an object of the current invention to provide means to ensure low emissions from an IC engine, especially during start up, without resorting to the provision of heating coils within the catalytic converter.

SUMMARY OF THE INVENTION

Aspects of the invention relate to a wastegate valve, an exhaust system and a method of heating a catalytic converter as defined in the appended claims.

According to an aspect of the invention there is provided a wastegate valve for a bypass path for a turbocharger in an internal combustion engine, the wastegate valve comprising a valve seat defining a plane which is non-orthogonal to the principal flow axis for gases flowing along the bypass path and a valve member pivotable from an open position to a closed position, wherein in the closed position the valve member is seated on the valve seat, and in a fully open position the valve member is positioned to direct gases exiting the bypass path onto a leading face of a catalytic converter monolith for heating the monolith.

There may be provided a wastegate valve for a bypass path for a turbocharger in an internal combustion engine, the wastegate valve comprising a valve seat defining a plane which is non-orthogonal to the principal flow axis for gases flowing along the bypass path and a valve member pivotable from an open position to a closed position, wherein in the closed position the valve member is seated on the valve seat, and in a fully open position the valve member is positioned to direct gases exiting the bypass path towards the centre of a leading face of a catalytic converter monolith. It will be understood that this is for the purpose of heating the monolith, in particular in an advantageous manner, in the light of further commentary herein.

According to an aspect of the invention there is provided a wastegate valve for a bypass path for a turbocharger in an internal combustion engine, the wastegate valve comprising a valve seat and a valve member pivotable between a closed position in which the valve member is seated on the valve seat and an open position in which the valve member is positioned to direct gases exiting the bypass path onto a leading face of a catalytic converter monolith for heating the monolith, wherein the valve seat defines a plane which is non-parallel, in use, to the leading face of a monolith toward which the gases are directed when the valve seat is in the open position.

Advantageously, the valve member directs hot gases onto the leading face of the catalytic converter element, for example during a start-up or early phase of an engine cycle, to heat the catalytic converter to or towards an optimum performance temperature.

The valve member may be pivotable, at its fully open position, to an angle of 30 to 70°, for example from 35 to 65, say 36 to 63°, preferably 40 to 60°, say 40 to 50° with respect to the plane defined by the valve seat.

It is an advantageous feature of the invention to reduce momentum change, and hence enthalpy loss, in the gas by limiting the re-direction of the gas as it exits the bypass path. Hence an increased open angle for the valve member helps to limit the change of gas direction.

The valve member may be pivotable, at its fully open position, to an angle of 0°, or greater than 0°, to 60°, or less than 60°, with respect to the principal flow axis along the bypass path. When the valve member is at an angle of 0° with respect to the principal flow axis the valve member will be parallel to the principal flow axis. The valve member may be pivoted to an angle of from 5 to 35° to the principal flow axis, optionally from 10 to 30°. Alternatively, the valve member may be pivoted to an angle of 45 to 60° with respect to the principal flow axis when the valve member is in its fully open position.

The bypass path may be defined by a conduit. The bypass path may or may not protrude into a chamber.

The wastegate may, but need not, pivot into and towards the centre of the chamber. The or at least some gases exiting the bypass path may exhaust along a flow path which is inclined at an angle to a or the principal flow path axis along the or a chamber.

In the case where the bypass path exhausts into the or a chamber towards one side of the chamber the valve member, in its fully open position, may be positioned or located at or towards the centre of the chamber. Thus, in an embodiment, the valve member opens in a direction which takes the valve member away from the wall of the chamber.

The valve element may be arranged to at least partially divert gases exiting the bypass path along a non-parallel flow path. For example, the valve element may be positioned such that gases exiting the bypass flow path are at least partially directed to or towards a downstream principal flow axis, for example a downstream principal flow axis aligned with a principal axis of a chamber.

According to an aspect of the invention there is provided an exhaust system for an internal combustion engine comprising a manifold, a turbocharger, a bypass path, a chamber and a catalytic converter, wherein the bypass path is selectively openable and closable by a wastegate valve to allow or prevent exhaust gas flowing from the manifold to bypass the turbocharger and thereby enter the chamber wherein when the wastegate valve is open exhaust gas is directed at least partially by the wastegate valve along the chamber to impinge upon the leading face of the catalytic converter.

Advantageously, allowing gases to bypass the turbocharger just after start-up of the engine ensures that the catalytic converter is heated by the exhaust gases faster than would otherwise happen. Moreover, using the wastegate valve to affect the flow direction of the gases ensures that the hot gases reach their target (the catalytic converter) as quickly as possible, Most preferably, the wastegate valve is operable to direct at least some of the gases exiting the bypass path onto the leading face, preferably at or towards the centre (i.e. substantially away from the edges) of the leading face, of the catalytic converter, wherein the heat flux can conduct radially outwards.

The bypass path may have a principal flow axis. The or a principal flow axis of the bypass path may be at an angle of between 30 and 70° to the principal axis of the chamber. In an example embodiment, the angle is 40°.

The bypass path may or may not protrude into the chamber.

Preferably the bypass valve engages or is engageable with a valve seat, provided on one end of the bypass path. The plane defined by the valve seat at the end of bypass path may be at an angle of less than 90° to 45°, say from 50 to 85°, for example from 55 to 80°, form 60 to 75°, say from 60 to 70° to the principal flow axis along the bypass path. Additionally or alternatively, the plane defined by the valve seat may be non-parallel to the leading face of the monolith.

The bypass valve may be actuated by an electrical actuator or with a vacuum actuator, or other mechanical actuator.

The bypass valve may pivot between its open position, which may be the default position, to its closed position where it engages, for example is seated on, the valve seat at the end of the bypass path.

Optionally, the turbocharger may be a twin-scroll turbocharger.

According to an aspect of the invention there is provided a method of heating a catalytic converter of an engine to an effective temperature, for example during a start-up phase of the engine, the method comprising directing gases from the engine to bypass a turbocharger impellor through a bypass path and directing the gases onto a monolith of the catalytic converter.

An advantage of this method is that the time for the catalytic converter to reach a desired operating temperature is reduced, thereby reducing emissions.

For the avoidance of doubt, any of the features described herein apply equally to any aspect of the invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
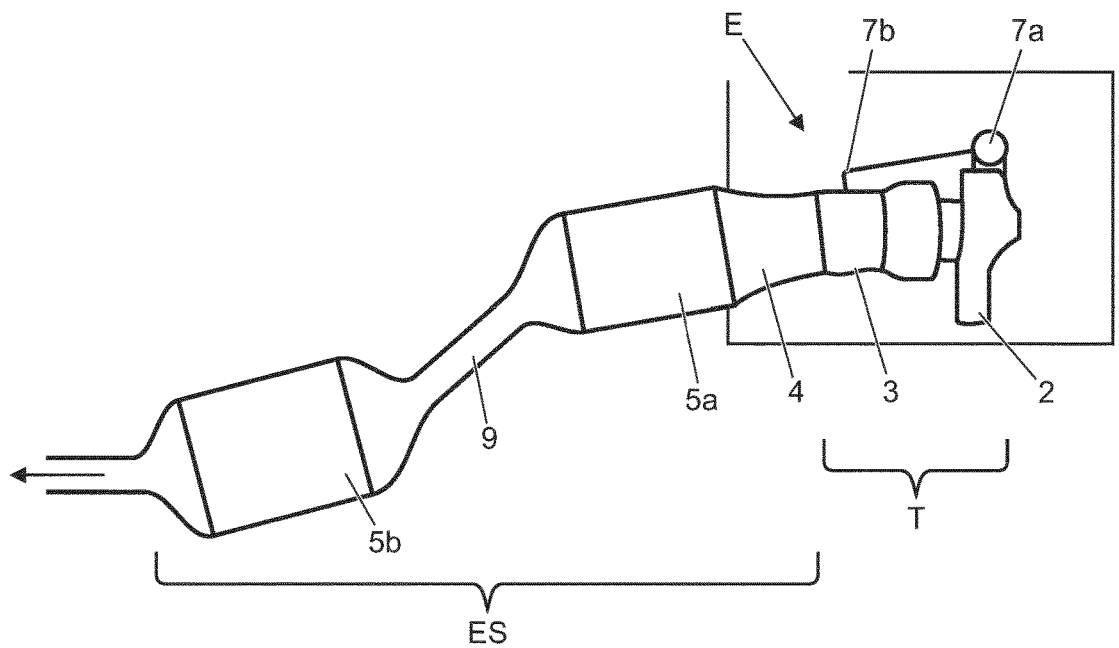
FIG. 1 shows a schematic overview of a part of an engine and exhaust system incorporating the invention.

Referring first to FIG. 1, there is shown an engine E for a motor vehicle. The engine E is provided with a turbocharger unit T which is operably connected and secured to an exhaust system ES. The turbocharger unit T comprises a turbocharger compressor housing 2 and a turbocharger turbine housing 3. In flow sequence and operably connected to the turbocharger unit T, the exhaust system ES comprises a catalyst inlet cone 4, a primary catalytic converter 5a, a secondary catalytic converter 5b coupled to the rest of the exhaust system ES which typically directs exhaust emissions toward the rear of the vehicle. A catalyst downpipe 9 interconnects the primary and secondary catalytic converters 5a, 5b.

The turbocharger unit T may comprise a twin scroll turbocharger but any turbocharger unit may be used. It will be understood that the present invention may be especially applicable to vehicles that are provided with twin scroll turbochargers, because such turbochargers typically have higher thermal mass than single scroll turbochargers, so they tend to delay light off of the catalytic converter by more than single scroll turbochargers. The turbocharger unit 2 comprises a turbine (not shown in FIG. 1) provided within the turbine housing 2 and arranged to be driven by impinging gases exhausting from the engine E to drive a compressor (not shown) housed in the compressor housing 2 in the usual manner. The turbocharger unit T also comprises a wastegate actuator 7a and a wastegate crank 7b, the purpose of which will be explained below.

In use, gases exiting the engine 1 are forced either along a bypass path 6 or through the turbine housing 3 to engage the turbine. In either case, the gas will flow into the inlet cone 4 and then through the primary catalytic converter 5a and into the exhaust system ES, and from there out of the vehicle.

Figure 2:
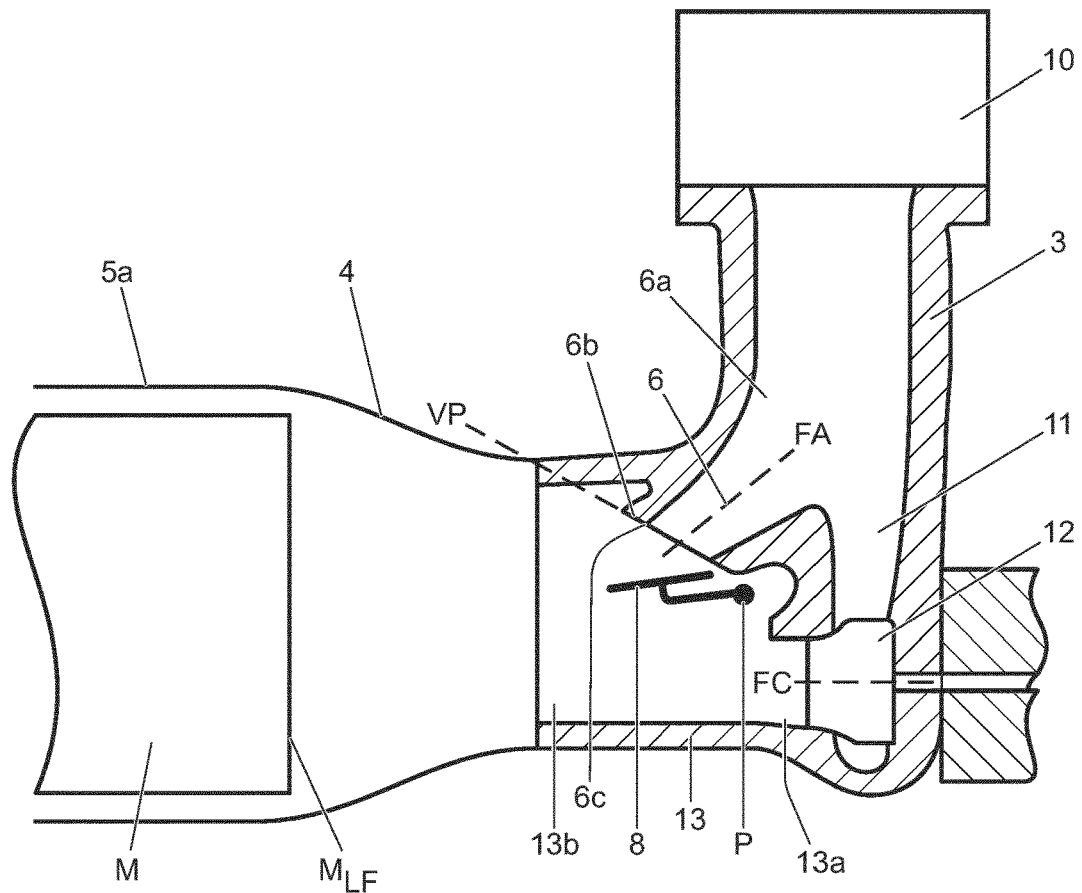
FIG. 2 is a sectional view of a part of the engine of FIG. 1.

FIG. 2 shows a partial cut away of the turbine housing 3 of the turbocharger unit T.

The turbine housing 3 is operably connected to an exhaust manifold 10 which directs gases from the engine E into the turbocharger unit T. Gases flowing through the turbine housing 3 can flow either via the turbine volute 11 to engage the turbine wheel 12 or via the bypass path 6. Gases exiting the turbine volute 11, and subsequent drivably engaging the turbine wheel 12 will enter an expansion chamber 13 with a principal flow axis FC.

The bypass path 6 is a conduit with a proximal end 6a communicating with the turbine housing and a distal end 6b communicating with the expansion chamber 13 and having a principal flow axis FA therebetween. The bypass path 6 protrudes into the chamber 13 and is occluded (or occludable) by a wastegate valve 8 which is shown in its open state. When closed, the wastegate valve 8 seats on the wastegate valve seat 6c at the distal end 6b of the bypass path 6. In its open state, the wastegate valve 8 is pivoted away from the bypass path 6 about a wastegate pivot axis P. The wastegate valve 8 is actuated and moved between its closed and open states by action of the wastegate actuator 7a, which is preferably an electric actuator 7 (not shown). The actuator 7a may comprise a pair of actuation arms. Reciprocal linear motion of the arms causes rotation back and forth of the crank 7b which, in turn, is operably connected to the wastegate valve 8 to cause pivoting motion of the wastegate valve 8 about pivot point P to pivot the valve 8 from the seat 6c into and/or towards the centre of the chamber 13.

The monolith M is held within the catalytic converter unit 5a as shown. The monolith M has a leading face $M_{LF}$ which is the face downstream of the chamber 13 and catalyst inlet cone 4.

As stated above, the principal flow path axis FA of and along the bypass path 6 is shown. Also as mentioned above, the distal end 6b of the flow path terminates in a valve seat 6c for the wastegate valve 8. The valve seat 6c at the distal end 6b sits in a plane VP which is non-orthogonal to the principal flow axis FA of the bypass path 6 and which is non-parallel to the leading face $M_{LF}$ of the monolith M. The principal flow path axis FC along the chamber 13 is shown extending from the proximal end 13a of the chamber 13, where gases are exhausted from the turbine wheel 12, to the distal end 13b of the chamber 13, to meet the leading face $M_{LF}$ of the monolith M. The principal flow axis path FC along the chamber 13 may be at an angle of between 30 and 70° to the principal axis FA of the chamber along the bypass path 6. In an example embodiment the angle is 40°. It is beneficial for the gases exhausted from the turbine to be directed to the leading face of the monolith M, as this reduces the amount of energy lost from the gases before they reach the monolith M. Although the gases that flow through the turbine are likely to lose more energy than the gases flowing through the bypass path 6, they still deliver useful energy to the monolith M. This may be especially important when the engine is operating under high load conditions, as the opening angle of the valve 8 may be relatively small to encourage a greater proportion of the exhaust gas to flow through turbine 12 rather than bypass path 6. This makes the gases that flow through the turbine 12 particularly important in delivering energy to the monolith M.

The electric actuator 7a is able to open the wastegate valve 8 to a large angle in respect to the principal flow path axis FA. The angle may be varied up to less than 90°, and is preferably from 55 to 75°, say from 60 to 70°.

Figure 3:
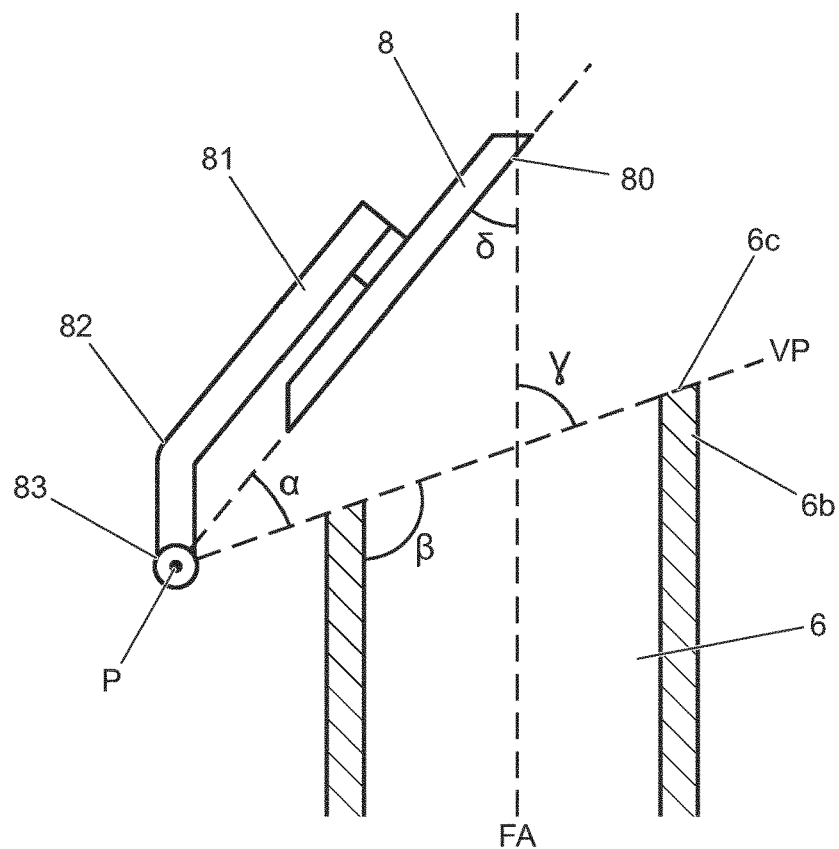
FIG. 3 is an enlarged view of a part of FIG. 2.

FIG. 3 shows a close up of the distal end 6b of the bypass path 6, with the wastegate valve 8 unseated from the valve seat 6c in an open state 8b. The wastegate valve 8 comprises a valve member 80 mounted on an arm 81 which is connected via a crank 82 to a pivot member 83, which pivots about the pivot point P. As shown, the angle 'α' between the plane defined by the base of the valve member 80 and that defined by the plane of the valve seat VP is from 30 to 70°, preferably 40 to 50°. The angle 'μ' between the plane of the valve seat VP and the walls of the bypass path 6 is from greater than 90 to 135°, preferably 105 to 120°. In a specific example the angle α is 45° and the angle μ is 113°. The angle 'γ' between the plane of the valve seat VP and the principal flow axis FA is from less than 90 to 45°. In a specific example the angle γ is 67°. The angle 'β' between the plane defined by the valve member 80 and the principal flow axis FA is preferably from 0°, or greater than 0°, to 60°, or less than 60°. When the valve member is at an angle of with respect to the principal flow axis FA the valve member will be parallel to the principal flow axis FA. Preferably, the valve member may be pivoted to an angle δ of from 10 to 30° to the principal flow axis FA. In a specific example the angle δ may be from 20 to 25°, say 23°.

Figure 4:
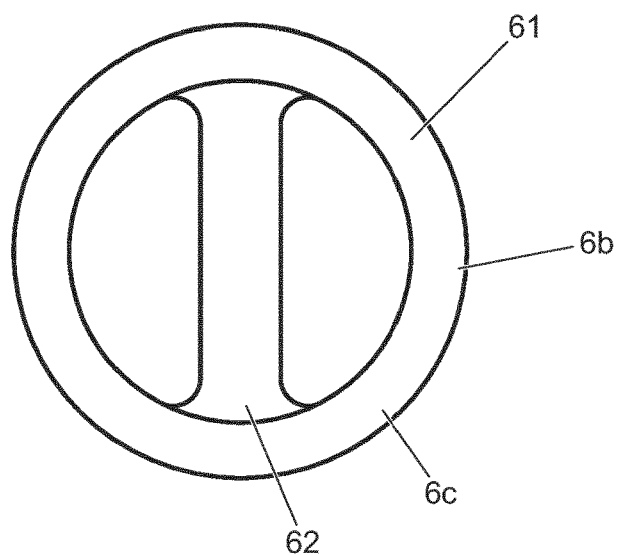
FIG. 4 is a detail of part of FIG. 3.

As is best seen from the view in FIG. 4, the valve seat 6c, situated at the distal end 6b of the bypass path 6, has a peripheral wall 61, and a transverse portion 62 which extends diametrically across the bypass path 6 to separate the flow path into two equal portions. The purpose of the transverse portion 62 is to support the valve member 80 when the wastegate valve 8 is in its closed state 8b.

Figure 5:
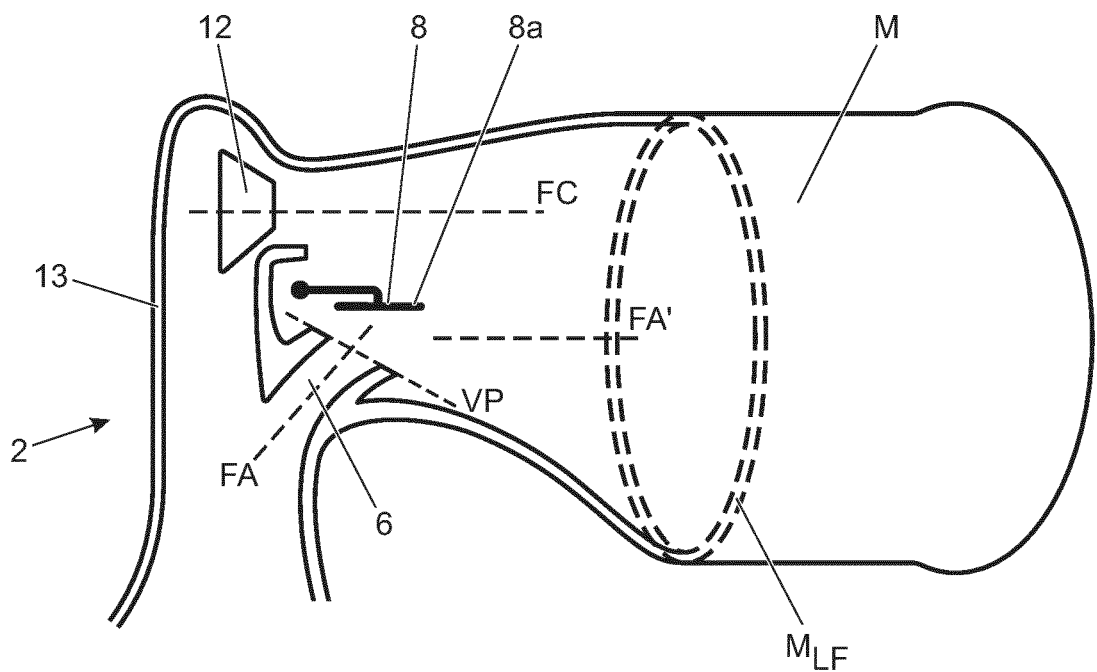
FIG. 5 shows a turbocharger unit of the invention during use.

In use, and as shown in FIG. 5, for example at start-up of an engine E, the wastegate valve 8 is held in its open state 8a by the electric actuator 7 (not shown). At this open state 8a, the wastegate valve 8 describes an angle of 45° to the plane VP. Gas which exhausts the engine 1 flows into the turbocharger unit 2 and can either flow via the turbine 12 or via the bypass path 6. Typically from about 10 to 80 v/v %, say about 30 to 70 v/v %, for example 55 to 65 v/v %, of the gas will flow via the bypass path 6, the remainder will flow via the turbine 12. Hot gas flowing through the bypass path 6 and along the principal flow axis FA will flow out past the distal end 6b of the bypass path 6 and be diverted along a principal flow axis FA' towards the leading face $M_{LF}$ of the monolith M by the valve member 80 of the bypass valve 8, which is in its open state 8a.

Accordingly, the bypass valve 8 encourages gas FA' exiting the distal end 6b of the bypass path 6 to flow along or parallel to the principal flow path axis FC and come into contact with the monolith M. Because the gases are encouraged to flow along or parallel to the principal flow path axis FC towards the monolith M they do not come into contact with the walls of the chamber 13 and hence transfer an optimum amount of heat to the monolith M. This leads to rapid heating of the monolith M to or towards the monolith light off temperature and thereby reduces emissions. Moreover, because a major proportion of the gas is diverted through the turbocharger turbine 12, those components are also heated by the gases exhausted from the engine, thereby ensuring that none of the components downstream of the engine 1 but upstream of the catalytic converter unit 4 provide a heat sink.

Figure 6:
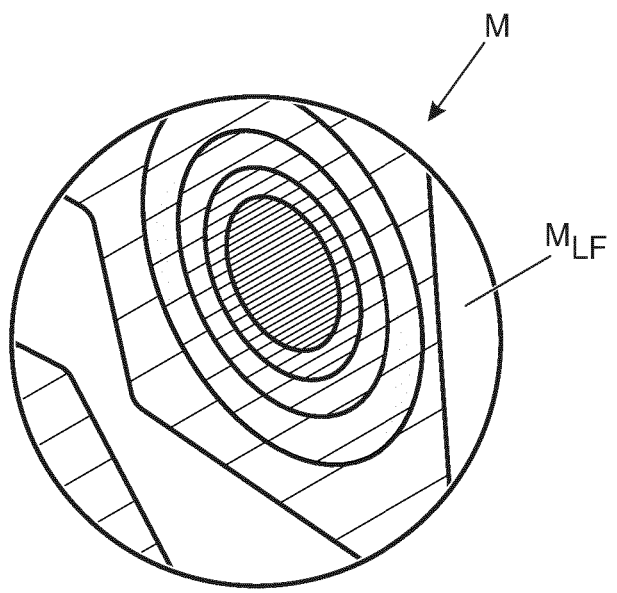
FIG. 6 shows a heat map of a catalytic monolith after use of the invention.

FIG. 6 provides a heat map of the leading face $M_{LF}$ of the monolith M after use of the bypass valve 8 of the invention. The denser the hatching the higher the temperature. The heat map clearly shows the greatest heating is felt at or towards the centre of the leading face $M_{LF}$, thereby indicating that gases are effectively directed towards the centre of the monolith M rather than towards the walls of the housing 13 and/or the walls of the cone 14.

Figure 7:
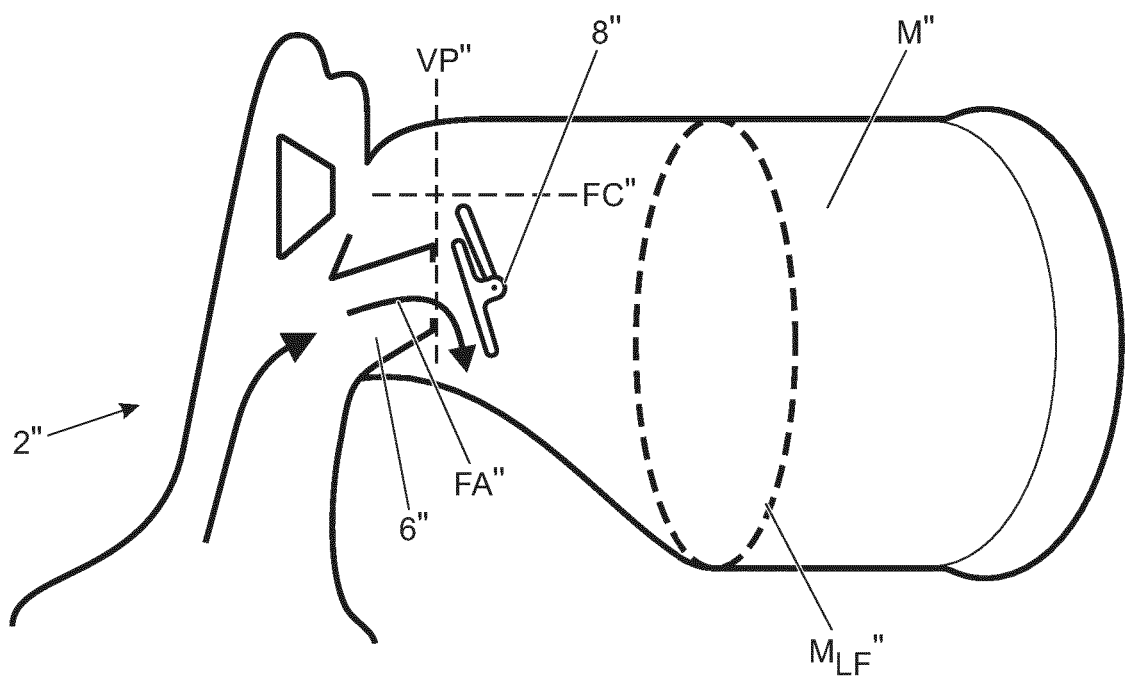
FIG. 7 shows a turbocharger unit.

For contrast, reference is made to FIG. 7 which shows a wastegate valve design which has a valve seat plane VP" orthogonal to the principal flow direction FC" of the gases through the chamber and a wastegate valve 8" which opens to a shallow angle (as is the case with prior art wastegate valves). As is clearly seen by the arrows, the flow direction of gases FA" is towards the walls of the chamber and consequently towards one side of the monolith M", thereby wasting valuable heat energy and not maximising the heat flow to heat the monolith towards the light-off temperature.

Referring back to FIGS. 1 to 6, once the monolith M of the catalytic converter unit 4 has been heated to its optimal operating temperature (or other temperature as may be defined), the wastegate valve 8 can be brought to its closed state 8a by action of the electric actuator 10 (i.e. bringing the valve member 80 into contact with valve seat 6c) to ensure that all of the gas exhausted from the engine 1 is directed via the turbine wheel 12. The electric actuator 7 may intermittently open and close the wastegate valve 8 to ensure effective operation of the associated vehicle (for example, sometimes it may be preferable to bleed off exhaust gas from the impeller path to ensure optimum operating efficiency of the turbocharger unit T).

Throughout the foregoing description two-dimensional angles have been shown in the figures and described. The skilled person will appreciate that while two-dimensional angles have been used, the components described are three-dimensional and so the angle between components is a compound angle. Variation in three-dimensional geometry may thus affect the two-dimensional angles mentioned.

Within the scope of this application it is expressly intended that the various aspects, embodiments, examples and alternatives set out in the preceding paragraphs, in the claims and/or in the description and drawings, and in particular the individual features thereof, may be taken independently or in any combination. Features described in connection with one embodiment are applicable to all embodiments, unless such features are incompatible.

The invention claimed is:

1. An exhaust system for an internal combustion engine, comprising:
   a turbocharger having a turbine,
   a bypass path arranged to allow exhaust gas to bypass the turbine, the bypass path having an inlet end and an outlet end including a valve seat, the bypass path having walls near the outlet defining a bypass path principal flow axis between the ends, wherein the valve seat defines a plane that is non-orthogonal to the bypass path principal flow axis, an angle between the plane defined by the valve seat and the walls of the bypass path being greater than 90° and up to 135°,
   a wastegate valve element,
   a chamber, and
   a catalytic converter,
      wherein the bypass path is selectively closable by the wastegate valve element to prevent exhaust gas flowing from the engine from bypassing the turbocharger and thereby enter the chamber when the wastegate valve element is seated in a closed condition on the valve seat and
      wherein the bypass path is selectively openable by the wastegate valve element when the wastegate valve element is in an open condition away from the valve seat to allow exhaust gas flowing from the engine to bypass the turbocharger, exhaust gas exiting the bypass path along the bypass path principal flow axis being diverted by the wastegate valve element along a different flow axis within the chamber to impinge directly upon a leading face of the catalytic converter,
      wherein exhaust gas exiting the turbine is directed along a second principal flow axis to impinge directly upon the leading face of the catalytic converter,
      wherein a plane defined by the wastegate valve element is parallel to the second principal flow axis, and
      wherein the different flow axis of the diverted gases exiting the outlet end of the bypass path is parallel to the plane defined by the wastegate valve element and the second principal flow axis of the gases exiting the turbine of the turbocharger.

2. The exhaust system as claimed in claim 1, wherein the wastegate valve element is pivotable, at its fully open position, to an open angle with respect to the plane defined by the valve seat, wherein the angle is from 30° to 70°.

3. The exhaust system as claimed in claim 2, wherein the open angle is from 36° to 63°.

4. The exhaust system as claimed in claim 3, wherein the open angle is from 40° to 50°.

5. The exhaust system as claimed in claim 1, wherein the wastegate valve element is pivotable, at its fully open position, to an open angle of 0° to 60°, with respect to the bypass path principal flow axis.

6. The exhaust system as claimed in claim 5, wherein the open angle is in a range from 45° to 60°.

7. The exhaust system as claimed in claim 1, wherein the bypass path is provided, at least in part, by a conduit, the valve seat being provided on a distal end of the conduit.

8. The exhaust system as claimed in claim 7, wherein the bypass path is arranged to protrude into the chamber.

9. The exhaust system as claimed in claim 1, wherein the wastegate valve element pivots into or towards a center of the chamber downstream of the bypass path.

10. The exhaust system according to claim 1, comprising an actuator to open and close the wastegate valve element, wherein the actuator is selected from an electric actuator, a vacuum actuator and a mechanical actuator.

11. The exhaust system according to claim 1, wherein the plane defined by the valve seat is non-parallel to the leading face of the catalytic converter.

12. The exhaust system as claimed in claim 1, wherein the turbocharger is a twin scroll turbocharger.

13. The exhaust system as claimed in claim 1, wherein the angle is in a range from 105° to 120°.

14. The exhaust system as claimed in claim 1, wherein the angle is 113°.

\* \* \* \* \*